United States Patent [19]

Thomas

[11] 4,170,676
[45] Oct. 9, 1979

[54] PROCESS, APPARATUS AND RESULTING THREE-LAYER NEEDLED NONWOVEN FABRIC

[75] Inventor: James H. Thomas, Swannanoa, N.C.

[73] Assignee: National Distillers & Chemical Corporation, New York, N.Y.

[21] Appl. No.: 888,949

[22] Filed: Mar. 22, 1978

[51] Int. Cl.² ............................................. B32B 5/12
[52] U.S. Cl. .................................... 428/113; 28/206; 28/207; 428/234; 428/300
[58] Field of Search ................... 428/234, 300, 113; 28/206, 207

[56] References Cited
U.S. PATENT DOCUMENTS

| | | | |
|---|---|---|---|
| 3,257,259 | 6/1966 | Law | 428/300 |
| 3,260,640 | 7/1966 | Owen | 428/300 |

Primary Examiner—Marion E. McCamish
Attorney, Agent, or Firm—Bell, Seltzer, Park & Gibson

[57] ABSTRACT

Process and apparatus for producing and the resulting nonwoven fabric adaptable for use as blankets and the like is characterized by increased production speed resulting in a more economical fabric, as follows. A bottom layer of at least one carded web is deposited with the fibers thereof oriented in the lengthwise direction on a moving conveyor driven at the same speed of travel as the carded web is produced. A reinforcing middle layer is preferably formed of a plurality of yarns cross-lapped onto the bottom layer for orienting the yarns in generally the widthwise direction. A top layer of at least one carded web is deposited onto the middle layer with the fibers thereof oriented in the lengthwise direction. The three-layer fabric is needled with from one to five needling machines depending upon the speed of operation thereof compared to the speed of formation of the fabric on the conveyor for forming needled fiber entanglements in the fabric interlocking the fibers with each other and forming an integrated needled nonwoven fabric. Production of the nonwoven fabric is thus performed at the increased speed of production equal to the speed of operation of the carding machines.

32 Claims, 7 Drawing Figures

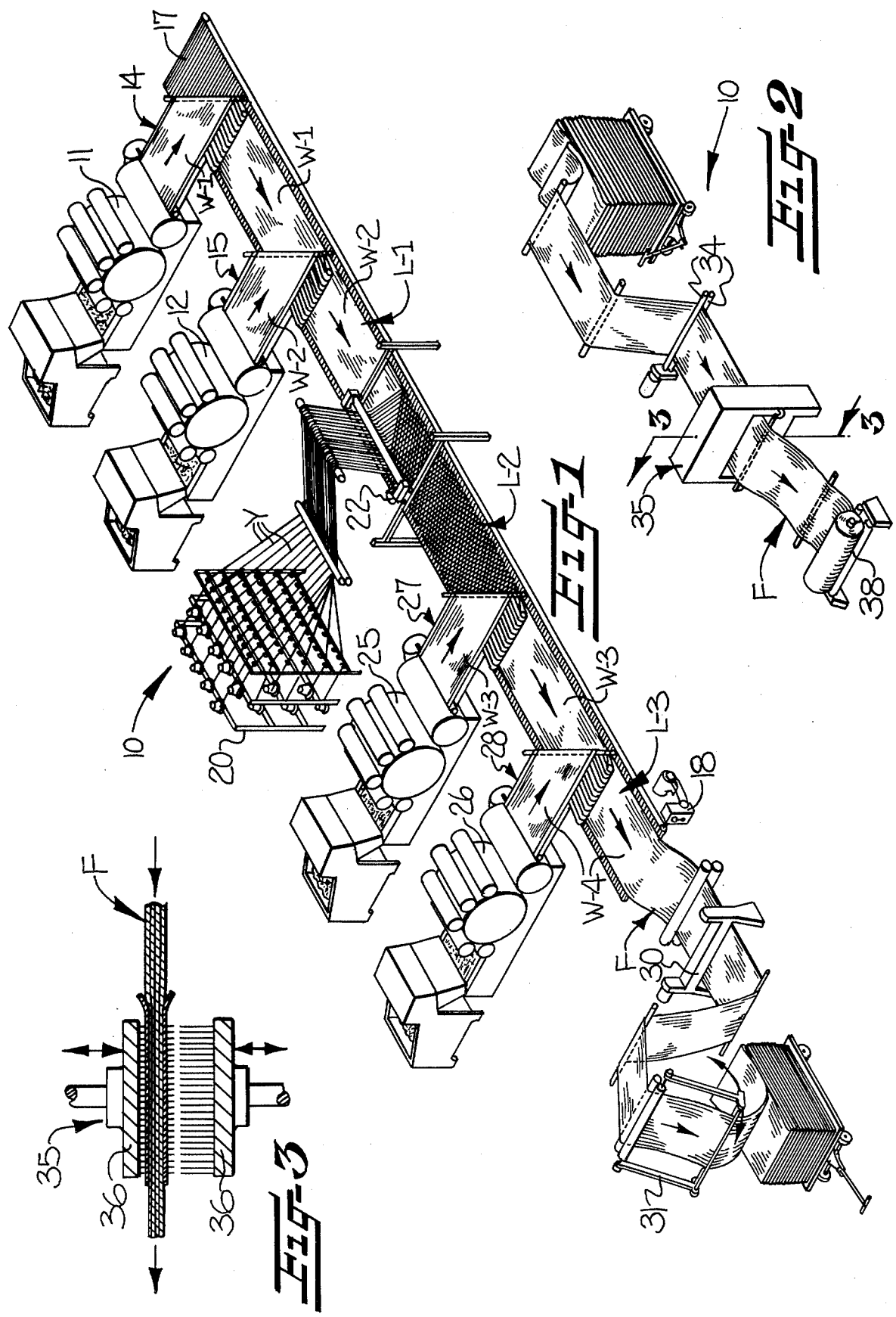

PROCESS, APPARATUS AND RESULTING THREE-LAYER NEEDLED NONWOVEN FABRIC

This invention relates to a process and apparatus for producing and the resulting three-layer needled nonwoven fabric which is adaptable for use as blankets and the like and which is characterized by being produced at increased production speeds producing a more economical fabric.

BACKGROUND OF THE INVENTION

In approximately the early 1960's, nonwoven fabrics began to be used in lieu of the conventional woven fabrics for blankets, bed coverings and like products, particularly for the more expensive uses of such products. Manifestly, nonwoven fabrics were much cheaper to produce than the heretofore conventionally utilized woven fabrics and could be napped to provide raised fiber surfaces on each of the faces thereof to produce a product which was very similar to woven blankets and the like.

One of the problems which arose in the early designing of constructions of nonwoven fabric, which would be suitable for use as blankets in lieu of the previously utilized woven material, was in providing sufficient strength to the blanket fabric in both the widthwise and lenghtwise directions which was easily obtained in the previous conventionally utilized woven blanket material. Although nonwoven fabric constructions of the chemically bonded type and of the densely needled type had previously been utilized for other products which would provide sufficient strength, these nonwoven fabric constructions lacked the desired flexibility and drapability for fabric utilized as blankets and the like.

Many nonwoven fabric constructions were proposed by various manufacturers for use as blankets and the like which purportedly provided desired strength and stability in the fabric in both the widthwise and lengthwise directions, while providing the desired flexibility and drapability. For the most part, these nonwoven fabric constructions included at least three superimposed layers of material in which the outer facing layers consisted of carded and cross-lapped textile fibers having the fibers thereof oriented in the widthwise direction for providing strength and stability to the fabric in the widthwise direction and a reinforcing middle layer or scrim which provided strength and stability to the fabric in the lengthwise direction.

An example of such a fabric construction which has been highly commercially successful is disclosed in U.S. Pat. No. 3,260,640, issued July 12, 1966, and assigned to the assignee of the present invention. As may be seen in this patent, the nonwoven fabric for use as blankets and the like was formed with outer layers of carded and cross-lapped textile webs forming outer facing layers having the fibers thereof oriented in the widthwise direction for providing strength and stability to the fabric in the widthwise direction and a reinforcing middle layer or scrim consisting specifically of an Arachne stitched fibrous web which provided strength and stability to the fabric in the lengthwise direction. Also, a number of manufacturers utilized a reinforcing middle layer or scrim consisting of a layer of spun yarns laid down between the outer layers in the lengthwise direction of the fabric for providing strength and stability to the fabric in the lengthwise direction.

Both of the above two described three-layer fabric constructions were then needled with a conventional needling machine forming a desired number of needled fiber entanglements interlocking the fibers of the layer with each other and forming an integrated needled nonwoven fabric. The number of needled fiber entanglements formed in the fabric was selected to provide the desired flexibility and drapability to the blanket fabric and not produce an unduly hard or boardy fabric which would not be suitable for use as blankets and the like.

While the above nonwoven fabrics have been successfully commercially produced now for a number of years and have replaced the previously conventional woven fabrics for a substantial portion of the blanket fabric market and have provided sufficient strength in both the widthwise and lengthwise directions while providing flexibility and drapability suitable for use of the fabrics as blankets, the processes and apparatus utilized for producing these blankets have been necessarily slow resulting in a more expensive resulting needled nonwoven fabric.

In this regard, the speed of production of the three-layer blanket fabric by the above described processes and apparatus was limited to the speed of operation of the cross-lapping mechanisms receiving webs of textile fibers being produced by carding machines and cross-lapping these webs onto a moving conveyor for building up of the three-layer fabric. Since the cross-lapping machines by design cross-lapped the carded webs back and forth onto a moving conveyor, the speed of operation was necessarily less than the speed in which the carded webs were produced by the carding machines.

OBJECTS AND SUMMARY OF THE INVENTION

Accordingly, it is the object of this invention to provide a process and apparatus of producing and a resulting nonwoven needled fabric which is adaptable for use as blankets and the like and which is characterized by increased production speed resulting in a more economical fabric.

By this invention, it has been found that the above object may be accomplished by providing a process and apparatus and resulting nonwoven fabric, generally as follows.

A bottom layer of textile fibers of indeterminate length and of predetermined width is formed by carding textile fibrous material with at least one carding machine for producing at least one carded web of desired weight. The at least one carded web is directly deposited by a depositing means onto an elongate moving conveyor with the fibers thereof oriented in the lengthwise direction of the fabric, as produced by the carding machine, for providing strength and stability in the lengthwise direction.

The elongate moving conveyor is moved or driven at the same speed of travel as the carded web is produced and withdrawn from the carding machine.

A reinforcing middle layer, preferably formed of a plurality of yarns, is fed onto the bottom layer while the bottom layer is being fed along the conveyor means, preferably by cross-lapping the plurality of yarns onto the bottom layer for orienting the yarns in generally the widthwise direction of the fabric for providing strength and stability in the widthwise direction.

A top layer of textile fibers of indeterminate length and of predetermined width is formed by carding textile fibrous material with at least one carding machine producing at least one carded web of desired weight. The at least one carded web is directly deposited by depositing means onto the middle layer while the bottom and middle layers are being fed along the conveyor means with the fibers thereof oriented in the lengthwise direction of the fabric for providing additional strength and stability in the lengthwise direction.

The thus formed three-layer fabric is needled with a needling machine for forming needled fiber entanglements interlocking the fibers of the layers with each other and forming an integrated needled nonwoven fabric. Depending upon the speed of operation of the needling machine with respect to the speed of formation of the three-layer fabric on the moving conveyor, from one to five needling machines may be utilized for each production line of the three-layer fabric prior to needling.

With the above process and apparatus, production of the nonwoven fabric is performed at the increased speed of production equal to the speed of operation of the carding machines, inasmuch as the previously utilized steps of cross-lapping of the carded webs received from the carding machines onto the moving conveyor have been eliminated and the moving conveyor may be operated at an increased speed equal to the speed at which the webs are being produced by the carding machines. The desired strength and stability in the nonwoven fabric is obtained by the unique arrangement of the fibers of the top and bottom layers and of the reinforcing middle layer.

As far as known, the use of outer layers which are not cross-lapped and which have the fibers thereof extending in the lengthwise direction of the fabric, to eliminate the slow speeds of production resulting from cross-lapping of the outer layers, has not heretofore been thought possible because of loss of strength in the widthwise direction of the fabric. However, by this invention, it has been determined that the reinforcing middle layer, preferably of cross-lapped yarns oriented generally in the widthwise direction of the fabric, can provide the necessary strength and stability to the fabric in the widthwise direction.

Also, with the use of the more conventional needling machines, it has been found that the above described production line for forming of the three-layer fabric prior to needling will supply sufficient fabric for accommodating five needling machines thus saving on the cost of equipment which heretofore required a fabric production line for each needling machine when the outer layers were cross-lapped.

BRIEF DESCRIPTION OF THE DRAWINGS

Some of the objects and advantages along with a general description of the invention having been given, other objects and advantages will appear in conjunction with the more specific description to follow, when taken in conjunction with the accompanying drawings, in which:

FIGS. 1 and 2 are perspective, schematic and diagrammatic views illustrating the process and apparatus of this invention for forming the nonwoven fabric of this invention;

FIG. 3 is an enlarged, partial, schematic, sectional view, taken generally along the line 3—3 of FIG. 2, illustrating the needling machine utilized;

DESCRIPTION OF A PREFERRED EMBODIMENT

Figure 6:
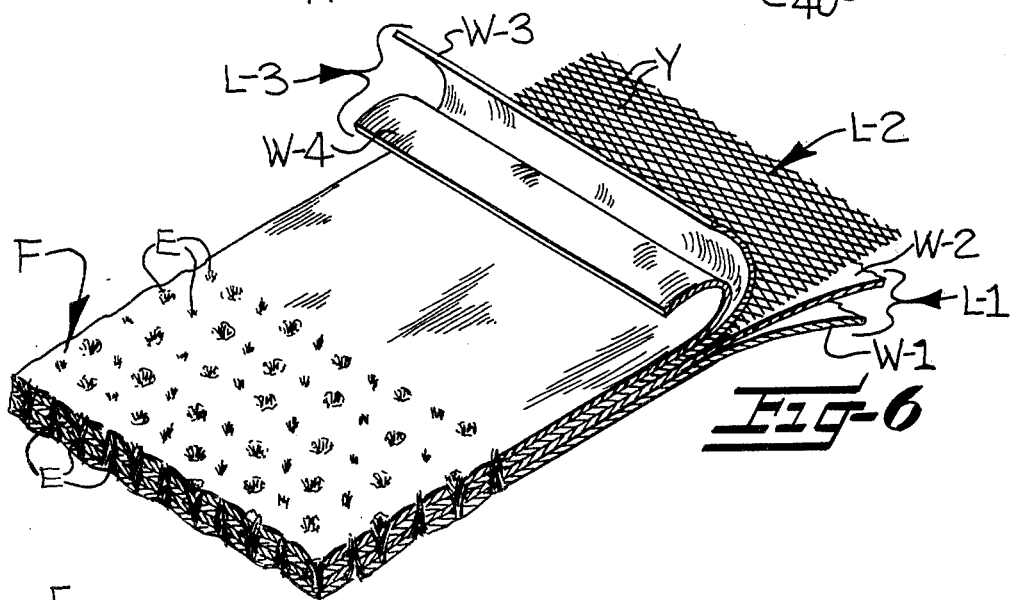
FIG. 6 is a perspective, diagrammatic view of the nonwoven fabric produced in accordance with this invention, with the right-hand portion thereof illustrating the three-layer fabric prior to needling with the webs of the top and bottom layers peeled back from the reinforcing middle layer for illustration and the left-hand portion thereof illustrating the three-layer fabric after needling.
Figure 7:
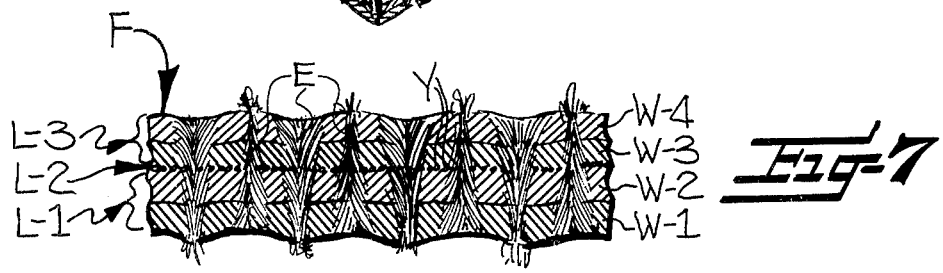
FIG. 7 is a partial, cross-sectional view taken through the needled portion of the nonwoven fabric of FIG. 6 illustrating the needled fiber entanglements through the fabric.

Referring now to the drawings, there is illustrated in FIGS. 1 and 2 a preferred form of a complete process and apparatus, generally indicated at 10, for producing nonwoven fabric F, as illustrated in FIGS. 6 and 7, in accordance with this invention.

As may be seen therein, a bottom layer L-1 of textile fibers is formed by carding textile fibrous material with, preferably, two separate carding machines 11, 12 producing first and second carded webs W-1, W-2 of desired weight with the fibers thereof oriented in generally the lengthwise direction. The first and second carded webs W-1, W-2 are fed from the carding machines on tape conveyor mechanisms 14, 15.

The first carded web W-1 is deposited onto one end of an elongate conveyor mechanism 17 moving in a generally longitudinal path of travel from the one end thereof to the other end. The carding machines, 11, 12 and tape conveyor mechanisms 14, 15 are disposed at generally a ninety degree angle with respect to the longitudinal direction of feed of the elongate conveyor mechanism 17. The tape conveyor mechanism 14 deposits the first carded web W-1 onto the one end of the moving conveyor mechanism 17 while inverting and turning the first carded web W-1 through an angle of approximately ninety degrees so that the web W-1 will be deposited on the moving conveyor 17 with the fibers thereof extending in generally the lengthwise direction of the fabric F being formed for ultimately providing strength and stability to the fabric being formed in the lengthwise direction.

Likewise, the second carded web W-2 is deposited onto the top of the web W-1 on the moving conveyor 17 as the web W-1 is being fed along the moving conveyor 17 for forming a two web bottom layer L-1 of desired weight consisting of the webs W-1 and W-2. The web W-2, like the web W-1, is inverted and turned by the tape conveyor mechanism 15 while being deposited onto the top of the web W-1 moving along the conveyor mechanism 17 for orienting the fibers thereof in the lengthwise direction of the fabric F being formed for providing strength and stability in the lengthwise direction.

The elongate conveyor mechanism 17 may be any desired type of moving conveyor mechanism consisting of a plurality of belts, connected wooden slats or the like and which is driven by any suitable drive means, such as the motor and gear box mechanism illustrated schematically in FIG. 1 at 18, for driving the conveyor mechanism 17 at a speed approximately equal to the speed of production of the carded webs W-1, W-2 by the carding machines 11, 12.

A reinforcing middle layer L-2 is formed, preferably, by feeding a plurality of textile yarns Y from a supply creel 20 of such yarns Y while forming a layer of such yarns extending in generally the lengthwise direction. The layer of yarns Y is cross-lapped by a cross-lapping mechanism 22 onto the bottom layer L-1 of textile fibers while the bottom layer L-1 is being fed along the conveyor mechanism 17 for producing a reinforcing middle layer L-2 of yarns Y oriented in generally the widthwise direction of the fabric F being formed for producing strength and stability in the widthwise direction.

A top layer L-3 of textile fibers is formed by carding fibrous material with two separate carding machines 25, 26 producing third and fourth carded webs W-3 and W-4 having the fibers thereof extending in generally the lengthwise direction of the carded webs. The carded webs W-3, W-4 are fed from the carding machines 25, 26 by tape conveyor mechanisms 27, 28 which are constructed like the tape conveyor mechanisms 14, 15 and are disposed, along with the carding machines 25, 26, at generally a ninety degree angle with respect to the conveyor mechanism 17.

The tape conveyor mechanism 27 deposits the third carded web W-3 onto the top of the middle layer L-2 as the bottom and middle layers L-1, L-2 are being fed along the conveyor mechanism 17, while inverting and turning the web W-3 through an angle of approximately ninety degrees so that the fibers thereof will be oriented in generally the lengthwise direction of the fabric being formed on the conveyor mechanism 17 for providing strength and stability thereto in the lengthwise direction.

Likewise, the tape conveyor mechanism 28 deposits the carded web W-4 onto the top of the web W-3 while the web W-3 and bottom and middle layers L-1, L-2 are being fed along the conveyor mechanism 17 for forming a two web upper layer L-3 of desired weight on top of the middle and bottom layers L-1, L-2. The carded web W-4 is also inverted and turned through an angle of approximately ninety degrees while being deposited by the tape conveyor mechanism 28 onto the top of the web W-3.

If additional or less weight is desired for the bottom and top layers L-1, L-3, more or less carding machines may be utilized.

The thus formed three-layer fabric F is then preferably fed through a needle tacking mechanism 30 which lightly needles the three-layer fabric F with banks of barbed needles for providing some fiber entanglements to hold the three layers L-1, L-2, L-3 together and allow for easy handling of the three-layer fabric F during the subsequent processing steps. Also, the thus formed three-layer fabric F is preferably taken up in a desired manner at this stage of its formation. If a needle tacking mechanism 30 is utilized, the taking-up means or step is preferably performed by a folder mechanism 31 forming stacks of the three-layer fabric F of desired length, as indicated schematically in FIG. 1.

Stacks of the thus formed three-layer fabric F are then taken to a needling machine 35 and may be fed from the supply stacks to the needling machine 35 in any suitable manner, such as by driven feed rolls 34. In the needling machine 35, the three-layer fabric F is needled with banks of barbed needles 36 penetrating the fabric at generally right angles thereto alternately from each face of the fabric F for forming a multiplicity of needled fiber entanglements E extending through the three layers L-1, L-2, L-3 and entangling the fibers of the layers with each other for interlocking the fibers of the layers with each other and forming an integrated, self-sustaining, needled, nonwoven fabric F. The thus needled fabric F may be then taken up by any suitable mechanisms such as the roll forming mechanism 38. The needled fabric F may then be napped, cut and bound for forming blankets and the like (not shown).

As may be seen from the above general description, the conveyor mechanism 17 is operated at the same speed of production of the carding machines 11, 12, 25, 26; whereby, the production of the three-layer fabric on the conveyor mechanism 17 is performed at the increased speed of production generally equal to the speed of production of the carding machines. Typically, the more conventional carding machines produce carded webs at approximately fifty-sixty feed per minute which allows driving of the conveyor mechanism 17 at fifty-sixty feet per minute. With the above speeds of operation of the carding machines and conveyor mechanism 17, a production line of apparatus, such as illustrated in FIG. 1 for forming the three-layer fabric F prior to needling with the needling loom 35, can prepare a sufficient supply of three-layer fabric F for feeding to from one to five needling machines 35, such as illustrated in FIG. 2. Typically, the more conventional needling machines will needle fabric at speeds approximately ten to fifteen feet per minute. Higher speed needling machines are commercially available which will needle nonwoven fabric at a higher speed and would allow the ratio of one production line for forming the three-layer fabric, in accordance with FIG. 1, to one production line for needling of the three-layer fabric, in accordance with FIG. 2.

By the above, it may be clearly seen that this invention provides a substantial savings in apparatus required for producing a given amount of nonwoven fabric.

Referring to the particular pieces of apparatus used in the process and apparatus of this invention, the carding machines 11, 12, 25, 26 may be any commercially available carding machines which will produce carded webs W-1, W-2, W-3, W-4 of desired weight. The construction and operation of such carding machines are well known to those with ordinary skill in the textile art and further explanation thereof is not deemed necessary.

As mentioned above, the elongate conveyor mechanism 17 may be of any convenient construction and the construction and operation of such types of conveyor mechanisms are also well known to those with ordinary skill in the art and further explanation thereof is not deemed necessary.

The supply creel 20 for the yarns Y is a typical and well known apparatus for containing and holding a plurality of spools or bobbins of yarn and supplying these yarns in any desired pattern. Further explanation of the construction and use of such a supply creel is not believed necessary. Likewise, the cross-lapping mechanism 22 for the yarns Y is also a conventional piece of textile equipment in which the construction and operation thereof is well known to those with ordinary skill in the art. The folding mechanism 31 is also a conventional piece of textile equipment and is constructed and operated in a well known manner.

The needle tacker 30 and the needling machine or needle loom 35 are constructed and operated in a manner well known to those in the nonwoven textile industry and include barbed needles 36 which are utilized to penetrate the nonwoven fabric and form the needled fiber entanglements E. It has also been determined that if the needling machine 35 forms approximately from about 750 needled fiber entanglements per square inch to about 900 needled fiber entanglements per square inch that sufficient entanglement of the fibers and layers will be obtained to form an integrated needled nonwoven fabric while retaining the flexibility and drapability and avoiding undue hardness and boardiness in the fabric.

The tape conveyor mechanisms 14, 15, 27, 28 are designed in accordance with this invention for both inverting and turning the carded webs through an angle of ninety degrees, as discussed above, for depositing the carded webs onto the moving conveyor 17 which is disposed at generally a ninety degree angle to the carding machines 11, 12, 25 and 26 and the tape conveyors 14, 15, 27, 28. Additionally, these tape conveyors 14, 15, 27, 28 are designed for exerting forces on the carded webs W-1, W-2, W-3, W-4 for spreading these carded webs from a conventional carded width of approximately eighty-four inches to a spread width of ninety inches so that the resulting needled nonwoven fabric will have a sufficient width to be trimmed to a finished width of approximately eighty-six inches for use as blankets and the like.

Figure 4:
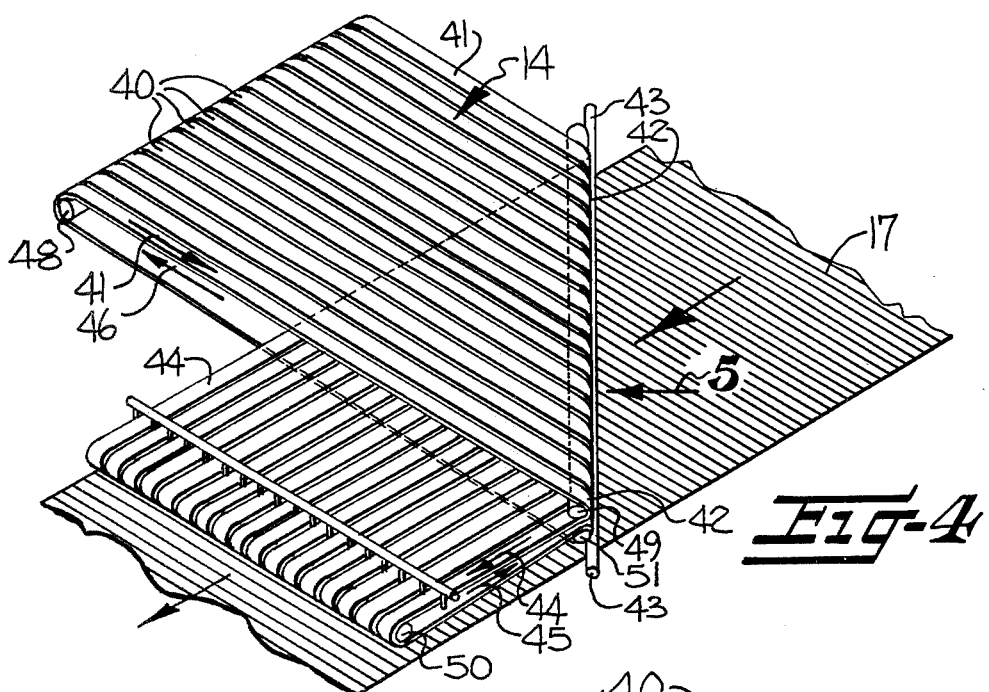
FIG. 4 is an enlarged, perspective, diagrammatic view illustrating one of the tape conveyor mechanisms utilized for depositing the carded webs onto the elongate moving conveyor mechanism of the process and apparatus of FIG. 1.

In this regard, each of the tape conveyor mechanisms 14, 15, 27, 28, as illustrated in FIG. 4, comprises a plurality of endless tapes 40 positioned in generally parallel, side-by-side arrangement and extending along a first flight 41 from the respective carding machines 11, 12, 25, 26 to a web conveying terminal portion 42 which is positioned over the elongate conveyor and extends at generally a forty-five degree angle with respect to the conveyor mechanism 17 for receiving the respective carded webs W-1, W-2, W-3, W-4 on the belts 40 in the first flight 41 and feeding the carded webs W-1, W-2, W-3 and W-4 therealong to the terminal portion 42 thereof, as shown in FIg. 1. From the terminal portion 42, the web passes downwardly and over a glass guide bar 43 positioned parallel with the terminal portion 42 of the tape conveyor mechanism and slightly below so that the web may pass downwardly and around the glass bar 43 for being inverted and turned through an angle of approximately ninety degrees for reception on the elongate conveyor 17.

The individual endless tapes 40 then pass through a second flight 44 from the terminal portion 42 longitudinally of the conveyor mechanism 17 in the direction of travel thereof. The endless conveyor tapes 40 then pass along a third flight 45 under the second flight 44 in a direction of travel opposite to the path of travel of the conveyor mechanism 17 and then along a fourth flight 46 under the first flight 41 in a direction of travel opposite to that of the first flight 41 toward the carding machines 11, 12, 25, 26. For purposes of positioning the endless tapes 40 in the above flights, the tapes 40 pass around guide rolls 48, 49, 50, 51, respectively.

Figure 5:
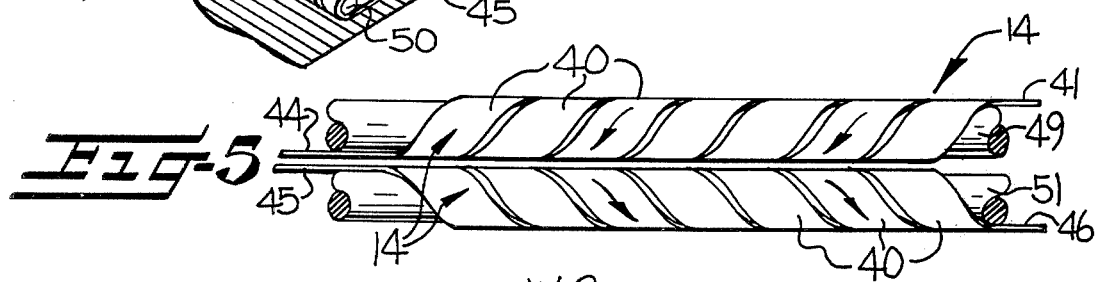
FIG. 5 is an inlarged, partial, end view of the web conveying terminal portion of the tape conveyor mechanism illustrated in FIG. 4 and taken generally in the direction of the arrow 5 of FIG. 4.

With the above arrangement, the web conveying terminal portion 42 comprises an opposite rotating nip of the endless tapes, as may be seen in FIG. 5, which are disposed at generally ninety degree angles of rotation with respect to each other, as indicated by the arrows in FIG. 5, so that when the respective carded web W-1, W-2, W-3, W-4 passes around the nip during depositing of the respective carded web on the elongate conveyor mechanism 17, the rotating nip of tapes 40 will produce forces on the respective web causing a spreading of the web from its carded width to a desired spread width for the nonwoven fabric so that the resulting fabric may be subsequently trimmed to a desired finished width.

In accordance with the preferred embodiment of this invention, each of the webs W-1, W-2, W-3, W-4 of carded textile fibers comprising the respective bottom and top layers L-1, L-3 comprise webs of fibers of approximately one-fourth to one-third pound per running yard for providing the bottom layer L-1 and the top layer L-3 each comprising layers weighing approximately one-half to two-thirds pound per running yard resulting in a fabric F which weighs approximately two by two and one-half pounds per cut segment thereof of seventy-two inches by ninety inches which is adaptable for use as a desired weight blanket or the like.

Further, in accordance with the preferred form of this invention, the middle layer L-2 of textile yarns Y is formed by feeding approximately sixty yarns from the supply creel 20 and cross-lapping these sixty yarns onto the bottom layer L-1 being fed on the conveyor mechanism 17 for positioning the yarns Y at an approximate twenty degree angle with each other across the width of the fabric F, as may be seen in FIG. 1, for providing desired strength and stability in the widthwise direction. With this arrangement, approximately forty-two running inches of yarn per running yard of fabric F being formed is utilized in the middle layer L-2 for providing sufficient strength and stability to the fabric. The yarns Y utilized in the middle layer L-2 are preferably spun nylon yarns, although filament nylon or other types of yarns may be used.

Also, while a middle reinforcing layer L-2 is preferably formed with cross-lapped yarns Y in accordance with the above description of this invention, other types of reinforcing material, such as Arachne stitched material as shown in the above-identified U.S. Pat. No. 3,260,640 with the fibers of the middle layer oriented in the widthwise direction, may also be used for providing sufficient strength and stability to the fabric F in the widthwise direction. However, it has been found that such Arachne scrim or reinforcing material is more expensive than the yarns Y utilized in accordance with the preferred form of this invention.

In the drawings and specification there has been set forth a preferred embodiment of the invention and, although specific terms are employed, they are used in a generic and descriptive sense only and not for purposes of limitation, the scope of the invention being defined in the claims.

What is claimed is:

1. A needled nonwoven fabric adaptable for use as blankets or the like, said fabric being of elongate indeterminate length and of predetermined width and comprising:

a bottom outer layer of carded textile fibers oriented in the lengthwise direction of the fabric for producing strength and stability in the lengthwise direction;

a reinforcing middle layer constructed for providing strength and stability to the fabric in the widthwise direction;

a top outer layer of carded textile fibers oriented in the lengthwise direction of the fabric for producing strength and stability in the lengthwise direction; and a multiplicity of needled fiber entanglements extending through said layers for interlocking the fibers of said layers with each other and forming an integrated needled nonwoven fabric.

2. A nonwoven fabric, as set forth in claim 1, in which said reinforcing middle layer comprises a plurality of textile yarns cross-lapped to extend in generally the widthwise direction of the fabric in sets of about sixty yarns disposed at approximately twenty degree angles with respect to adjacent sets across the width of the fabric.

3. A nonwoven fabric, as set forth in claim 2, in which said reinforcing middle layer further comprises approximately forty-two running inches of each of said cross-lapped yarns per running yard of said fabric being formed.

4. A nonwoven fabric, as set forth in claim 1, in which said reinforcing middle layer comprises a plurality of textile yarns disposed in overlapping relation and extending generally in the widthwise direction of the fabric.

5. A nonwoven fabric, as set forth in claim 4, in which said yarns comprising said reinforcing middle layer comprise spun nylon yarns.

6. A nonwoven fabric, as set forth in claim 1, in which said bottom outer layer and said top outer layer each comprise at least one web of carded textile fibers of approximately one-half to two-thirds pound per running yard.

7. A nonwoven fabric, as set forth in claim 1, which weighs approximately two to two and one-half pounds per cut segment thereof of seventy-two inches by ninety inches.

8. A needled nonwoven fabric adaptable for use as blankets or the like, said fabric being of elongate indeterminate length and of predetermined width and comprising:

a bottom outer layer comprising two superimposed webs of carded textile fibers of desired weight having the fibers of each oriented in the lengthwise direction of said fabric for providing strength and stability in the lengthwise direction;

a reinforcing middle layer comprising a plurality of textile yarns cross-lapped to extend in generally the widthwise direction of the fabric for providing strength and stability in the widthwise direction;

a top outer layer comprising two superimposed webs of carded textile fibers of desired weight each having the fibers thereof oriented in the lengthwise direction of the fabric for providing strength and stability in the lengthwise direction; and a multiplicity of needled fiber entanglements extending through said layer for interlocking the fibers of said layers with each other and forming an integrated needled nonwoven fabric.

9. A nonwoven fabric, as set forth in claim 8, in which each of said webs of carded textile fibers comprising said bottom and top layers comprise a web of fibers of approximately one-fourth to one-third pound per running yard for providing said top layer and said bottom layer each comprising layers weighing approximately one-half to two-thirds pound per running yarn resulting in a fabric which weighs approximately two to two and one-half pounds per cut segment thereof of seventy-two inches by ninety inches adaptable for use as a desired weight blanket and the like.

10. A process for producing a needled nonwoven fabric adaptable for use as blankets and the like and being characterized by increased production speed resulting in a more economical fabric, said process comprising:

forming a bottom layer of textile fibers by carding textile fibrous material and producing at least one carded web of desired weight, and depositing the web on an elongate moving conveyor means with the fibers thereof oriented in the lengthwise direction of the fabric for providing strength and stability in the lengthwise direction;

moving the elongate conveyor means in the lengthwise direction at the same speed of travel as the carded web is being produced;

forming a reinforcing middle layer of textile yarns by cross-lapping a plurality of yarns onto the bottom layer while the bottom layer is being fed along the conveyor means and orienting the yarns in generally the widthwise direction of the fabric for providing strength and stability in the widthwise direction;

forming a top layer of textile fibers by carding textile fibrous material and producing at least one carded web of desired weight, and depositing the web onto the middle layer while the bottom and middle layers are being fed along the conveyor means, and with the fibers thereof oriented in the lengthwise direction of the fabric for providing additional strength and stability in the lengthwise direction; and needling the thus formed three-layer fabric for forming needled fiber entanglements interlocking the fibers of the layers with each other and forming an integrated needled nonwoven fabric; whereby, the three-layer fabric is produced at a speed of production equal to the speed of producing the carded webs.

11. A process, as set forth in claim 10, in which said step of depositing the carded web on an elongate moving conveyor means comprises feeding the carded web from a carding machine at generally a ninety degree angle with respect to the elongate conveyor means while turning and inverting the carded web through an angle of approximately ninety degrees and depositing the carded web onto the elongate conveyor means.

12. A process, as set forth in claim 10, in which said step of depositing the carded web on an elongate moving conveyor means includes spreading the carded web from a predetermined carded width to a desired wider width for the nonwoven fabric so that the resulting fabric may be subsequently trimmed to a desired finished width.

13. A process, as set forth in claim 12, in which said step of spreading the width of the carded web comprises spreading a conventionally formed carded web of approximately eighty-four inches to a spread width of approximately ninety inches so that the resulting nonwoven fabric may be trimmed to a finished width of approximately eighty-six inches.

14. A process, as set forth in claim 10, in which said process further includes taking up the three-layer fabric prior to said needling step and forming supplies thereof, and said needling step further includes feeding the supplies of three-layer fabric through a selected number of from one to five needling machines depending upon the speed of orientation thereof as compared to the speed of said steps of forming the three-layer fabric.

15. A process, as set forth in claim 14, in which
said process further includes needle tacking the three-layer fabric prior to said taking-up step for ease in handling, and
said step of taking-up the three-layer fabric comprises folding the fabric into stacks of desired length for feeding through the needling machines during said needling step.

16. A process, as set forth in claim 14, in which
said step of moving the elongate conveyor means comprises driving the conveyor means at approximately fifty to sixty feet per minute, and
said step of needling includes feeding the fabric through a selected number of needling machines at a speed of from about ten to sixty feet per minute.

17. A process, as set forth in claim 10, in which
said step of moving the elongate conveyor means comprises driving the conveyor means at approximately fifty to sixty feet per minute which is approximately the same as the conventional speed of producing carded webs,
said process further includes taking-up the three-layer fabric prior to said needling step and forming supplies thereof, and
said needling step includes feeding respective supplies of the three-layer fabric through five needling machines at a speed of approximately ten to fifteen feet per minute which generally equals the conventional speed of operation of such needling machines.

18. A process of producing needled nonwoven fabric adaptable for use as blankets and the like and being characterized by increased production speed resulting in a more economical fabric, said process comprising:
forming a bottom layer of textile fibers by separately carding textile fibrous material and producing first and second carded webs of desired weight, depositing the first carded web on an elongate moving conveyor means with the fibers thereof oriented in the lengthwise direction and depositing the second carded web onto the first carded web with the fibers thereof also oriented in the lengthwise direction and while the first carded web is being fed along the conveyor means for forming a two web bottom layer of desired weight with the fibers thereof oriented in the lengthwise direction of the fabric for providing strength and stability to the fabric in the lengthwise direction;
moving the elongate conveyor means at the same speed of travel as the webs are being produced by the carding machines;
forming a reinforcing middle layer of textile yarns by cross-lapping a plurality of yarns onto the bottom layer while the bottom layer is being fed along the conveyor means and producing a reinforcing layer on the bottom layer having the yarns oriented in generally the widthwise direction of the fabric for providing strength and stability in the widthwise direction;
forming a top layer of textile fibers by separately carding textile fibrous material and producing third and fourth carded webs of desired weight, depositing the third web onto the middle layer while the bottom and middle layers are being fed along the conveyor means with the fibers thereof oriented in the lengthwise direction, and depositing the fourth web onto the third web with the fibers thereof also oriented in the lengthwise direction and while the bottom and middle layers and third web are being fed along the conveyor means for forming a two web top layer of desired weight with the fibers thereof oriented in the lengthwise direction of the fabric for providing additional strength and stability in the lengthwise direction; and
needling the thus formed three-layer fabric for forming needled fiber entanglements interlocking the fibers of the layers with each other and forming an integrated needled nonwoven fabric;
whereby the fabric is produced at a speed of production equal to the speed of producing the carded webs.

19. A process, as set forth in claim 18, in which said steps of producing first, second, third and fourth carded webs comprise producing respective carded webs of approximately one-fourth to one-third pound per running yard for forming top and bottom layers of approximately one-half to two-thirds pound per running yard respectively.

20. A process, as set forth in claim 18, in which said step of forming a reinforcing middle layer of textile yarns includes feeding approximately sixty yarns from a supply creel while forming a layer of such yarns extending in generally the lengthwise direction, and orienting the yarns during cross-lapping at an approximate twenty degree angle with respect to each other across the width of the fabric for providing strength and stability in the widthwise direction.

21. A process, as set forth in claim 20, in which said step of forming a reinforcing middle layer of textile yarns further includes cross-lapping approximately forty-two running inches of yarn per running yard of the fabric being formed for providing sufficient strength and stability to the fabric.

22. A process of producing an improved needled nonwoven fabric adaptable for use as blankets and the like and being characterized by increased production speed resulting in a more economical fabric, said process comprising:
forming a bottom layer of textile fibers including carding textile fibrous material with two separate carding machines and producing first and second carded webs of desired weight, feeding the first carded web from the carding machines on a tape conveyor mechanism and depositing the first carded web on an elongate moving conveyor means disposed at generally a ninety degree angle with respect to the carding machines and tape conveyor mechanism while inverting and turning the first carded web through an angle of approximately ninety degrees, and feeding the second carded web from the carding machine on a tape condenser mechanism parallel to the first tape condenser mechanism and depositing the second carded web onto the first carded web while the first carded web is being fed along the conveyor mechanism while inverting and turning the second carded web through an angle of approximately ninety degrees for forming a two web bottom layer of desired weight with the fibers thereof oriented in the lengthwise direction of the fabric for providing strength and stability to the fabric in the lengthwise direction;
driving the elongate conveyor means at the same speed of travel as the webs are being produced by the carding machines;

forming a reinforcing middle layer of textile yarns including feeding a plurality of yarns from a supply while forming a layer of such yarns extending in generally the lengthwise direction, and cross-lapping the layer of yarns onto the bottom layer of textile fibers while the bottom layer is being fed along the conveyor means producing a reinforcing layer on the bottom layer having the yarns reoriented oriented in generally the widthwise direction of the fabric for producing strength and stability in the widthwise direction;

forming a top layer of textile fibers including carding textile fibrous material with two separate carding machines and producing third and fourth carded webs of desired weight, feeding the third carded web from the carding machine with a tape condenser mechanism parallel with said other two tape condenser mechanisms and depositing the third web onto the middle layer while the bottom and middle layers are being fed along the conveyor means while inverting and turning the carded web through an angle of approximately ninety degrees, and feeding the fourth carded web from the carding machine with a fourth tape conveyor mechanism parallel to said other three tape conveyor mechanisms and depositing the fourth web onto the third web while the bottom and middle layers and third web are being fed along the conveyor means while inverting and turning the fourth carded web through an angle of approximately ninety degrees for forming a two web top layer of desired weight with the fibers thereof oriented in the lengthwise direction of the fabric for producing additional strength and stability in the lengthwise direction;

taking-up the thus formed three-layer fabric and forming a supply thereof; and needling the thus formed three-layer fabric by feeding the supply of fabric through a selected number of from one to five needling machines depending upon the speed of operation thereof for forming needle fiber entanglements interlocking the fibers of the layers with each other and forming an integrated needled nonwoven fabric;

whereby, the production of the nonwoven fabric is performed at the increased speed of production equal to the speed of operation of the carding machines.

23. A process, as set forth in claim 22, in which
said process further includes needle tacking the three-layer fabric prior to said taking-up step for ease in handling, and
said step of taking-up the three-layer fabric comprises folding the fabric into stacks of desired length for feeding through the needling machines during said needling step.

24. A process, as set forth in claim 22, in which said steps of forming bottom and top layers of textile fibers further includes spreading the carded webs with the tape conveyor mechanisms from a carded width to a desired width for the nonwoven fabric so that the resulting fabric may be subsequently trimmed to a desired finished width.

25. A process for producing a needled nonwoven fabric adaptable for use as blankets and the like and being characterized by increased production speed resulting in a more economical fabric, said process comprising:

forming a bottom layer of carded textile fibers of indeterminate length and of predetermined width with the fibers thereof oriented in the lengthwise direction for providing strength and stability in the lengthwise direction;

advancing the bottom layer lengthwise while depositing a reinforcing middle layer constructed for providing strength and stability to the fabric in the widthwise direction onto the advancing bottom layer;

forming a top layer of carded textile fibers of indeterminate length and predetermined width and depositing the same onto the middle layer as the bottom and middle layers are being advanced lengthwise, and with the fibers of the top layer being oriented in the lengthwise direction of the fabric for providing additional strength and stability in the lengthwise direction; and needling the thus formed three-layer fabric and forming needled fiber entanglements interlocking the fibers of the layers with each other and forming an integrated needled nonwoven fabric.

26. Apparatus for producing nonwoven fabric adaptable for use as blankets and the like and being characterized by increased production speed producing a more economical fabric, said apparatus comprising:

an elongate conveyor means moving in a generally longitudinal path of travel from one end to the other end thereof;

means for forming a bottom layer of textile fibers including at least one carding machine for producing a carded web of desired weight, and means for depositing the carded web onto said moving conveyor means generally at one end thereof with the fibers thereof oriented in the lengthwise direction for providing strength and stability in the lengthwise direction;

means for feeding a reinforcing middle layer constructed for providing strength and stability to the fabric in the widthwise direction onto the bottom layer of textile fibers at generally a medial portion of said conveyor means while the bottom layer is being fed along said conveyor means;

means for forming a top layer of textile fibers including at least one carding machine for producing a carded web of desired weight, and means for depositing the carded web onto the middle layer at generally the other end of said conveyor means while the bottom and middle layers are being fed along said conveyor means with the fibers thereof oriented in the lengthwise direction for providing additional strength and stability in the lengthwise direction;

means driving said elongate conveyor means at a speed generally equal to the speed of production of said carding machines; and at least one needling machine for receiving the thus formed three-layer fabric and for needling the fabric to form needled fiber entanglements interlocking the fibers of the layers with each other and forming an integrated needled nonwoven fabric;

whereby, the production of the three-layer fabric is performed at the increased speed of production generally equal to the speed of production of said carding machines.

27. Apparatus for producing nonwoven fabric adaptable for use as blankets and the like and being characterized by increased production speed producing a more economical fabric, said apparatus comprising:

an elongate conveyor means moving in a generally longitudinal path of travel from one end to the other end thereof;

means for forming a bottom layer of textile fibers including at least one carding machine for producing a carded web of desired weight, and means for depositing the carded web onto said moving conveyor means generally at the one end thereof with the fibers thereof oriented in the lengthwise direction for providing strength and stability in the lengthwise direction;

means for forming a reinforcing middle layer of textile yarns including a supply means containing a plurality of such yarns, and a cross-lapping mechanism for receiving the yarns and for cross-lapping the yarns onto the bottom layer of textile fibers at generally a medial portion of said conveyor means while the bottom layer is being fed along said conveyor means for orienting the yarns in generally the widthwise direction for providing strength and stability in the widthwise direction;

means for forming a top layer of textile fibers including at least one carding machine for producing a carded web of desired weight, and means for depositing the carded web onto the middle layer at generally the other end of said conveyor means while the bottom and middle layers are being fed along said conveyor means with the fibers thereof oriented in the lengthwise direction for providing additional strength and stability in the lengthwise direction;

means driving said elongate conveyor means at a speed generally equal to the speed of production of said carding machines; and at least one needling machine for receiving the thus formed three-layer fabric and for needling the fabric to form needled fiber entanglements interlocking the fibers of the layers with each other and forming an integrated needled nonwoven fabric;

whereby, the production of the three-layer fabric is performed at the increased speed of production generally equal to the speed of production of said carding machines.

28. Apparatus, as set forth in claim 27, in which each of said web depositing means of said means for forming a bottom layer and said means for forming a top layer comprises a tape conveyor mechanism extending from said respective carding machines at generally a ninety degree angle with respect to said elongate conveyor means and having a web conveying terminal portion positioned over said elongate conveyor means extending at generally a forty-five degree angle with respect to said elongate conveyor means for receiving the respective carded web and feeding the carded web therealong to the terminal portion thereof and down onto said elongate conveyor means while being inverted and turned through an angle of approximately ninety degrees.

29. Apparatus, as set forth in claim 28, in which said tape conveyor mechanisms each comprise a plurality of endless tapes positioned in generally parallel, side-by-side arrangement and extending along a first upper flight from said carding machine to said web conveying terminal portion, along a second flight from said terminal portion longitudinally of said conveyor means in the direction of travel thereof, along a third flight under said second flight in a direction opposite to the path of travel of said conveyor means and along a fourth flight under said first flight in a direction of travel opposite to that of said first flight toward said carding machine, which results in said web conveying terminal portion comprising an opposite rotating nip of said belts being disposed at generally ninety degree angles of rotation with respect to each other, so that when the carded web passes around said nip during depositing thereof on said elongate conveyor means, said nip will produce forces on the web to cause a spreading of the web from its carded width to a desired width for the nonwoven fabric so that the resulting fabric may be subsequently trimmed to a desired finished width.

30. Apparatus for producing nonwoven fabric adaptable for use as blankets and the like and being characterized by increased production speed producing a more economical fabric, said apparatus comprising:

an elongate conveyor means moving in a generally longitudinal path of travel from one end to the other end thereof;

means for forming a bottom layer of textile fibers including two separate carding machines for producing first and second carded webs of desired weight, means for depositing the first carded web onto said moving conveyor means generally at one end thereof, and means for depositing the second carded web onto the first carded web generally at the one end of said conveyor means while the first carded web is being fed along said conveyor means for forming a two web bottom layer of desired weight with the fibers thereof oriented in the lengthwise direction of the fabric for providing strength and stability to the fabric in the lengthwise direction;

means for forming a reinforcing middle layer of textile yarns including a supply creel means containing a plurality of such yarns, and a cross-lapping mechanism for receiving the yarns from said supply creel and for cross-lapping the yarns onto the bottom layer of textile fibers generally at a medial portion of said conveyor means while the bottom layer is being fed along said conveyor means for orienting the yarns in generally the widthwise direction of the fabric for providing strength and stability in the widthwise direction;

means for forming a top layer of textile fibers including two separate carding machines producing third and fourth carded webs of desired weight, means depositing the third layer onto the middle layer generally at the other end of said conveyor means while the bottom and middle layers are being fed along said conveyor means, and means depositing the fourth web onto the third web generally at the other end of said conveyor means while the bottom and middle layers and third web are being fed along said conveyor means for forming a two web top layer of desired weight with the fibers thereof oriented in the lengthwise direction of the fabric for providing additional strength and stability in the lengthwise direction;

means driving said elongate conveyor means at a speed generally equal to the speed of production of said carding machines; and from one to five needling machines, selected according to the speed of operation thereof as compared with the speed of formation of the three-layer fabric on said conveyor means, for receiving the thus formed three-layer fabric and for needling the fabric to form needled fiber entanglements interlocking the fibers of the layers with each other and forming an integrated needled nonwoven fabric;

whereby, the production of the three-layer fabric is performed at the increased speed of production generally equal to the speed of production of said carding machines.

31. Apparatus, as set forth in claim 30, further including a needle tacking mechanism positioned adjacent the other end of said conveyor means for receiving the three-layer fabric and needle tacking the fabric for ease in handling, and folding means positioned adjacent said needle tacking means for receiving the fabric and for forming stacks thereof of desired length for feeding through said needling machines.

32. Apparatus, as set forth in claim 21, in which each of said web depositing means of said means for forming a bottom layer and for forming a top layer comprises a tape conveyor mechanism extending from said respective carding machines and at generally a ninety degree angle with respect to said elongate conveyor means and having a web conveying terminal portion positioned over said elongate conveyor means and extending at generally a forty-five degree angle with respect to said conveyor means for receiving the respective carded webs and feeding the carded webs therealong to the terminal portion thereof and down onto said elongate conveyor means while being inverted and turned through an angle of approximately ninety degrees, each of said tape conveyor mechanisms comprise a plurality of endless tapes positioned in generally parallel, side-by-side arrangement and extending along a first upper flight from said carding machine to said web conveying terminal portion, along a second flight from said terminal portion longitudinally of said conveyor means in the direction of travel thereof, along a third flight under said second flight in a direction opposite to the path of travel of said conveyor means and along a fourth flight under said first flight in a direction of travel opposite to that of said first flight toward said carding machine, which results in said terminal portion comprising an opposite rotating nip of said tapes being disposed at generally ninety degree angles of rotation with respect to each other, so that when the carded web passes around said nip during depositing thereof on said elongate conveyor means, said nip will produce forces on the web causing a spreading of the web from its carded width to a desired width for the nonwoven fabric so that the resulting fabric may be subsequently trimmed to a desired finished width.

* * * * *

UNITED STATES PATENT AND TRADEMARK OFFICE
CERTIFICATE OF CORRECTION

PATENT NO. : 4,170,676
DATED : Oct. 9, 1979
INVENTOR(S) : James H. Thomas

It is certified that error appears in the above-identified patent and that said Letters Patent are hereby corrected as shown below:

Column 1, line 16, "expensive" should be --inexpensive--;
Column 8, line 17, delete "by" and insert --to--;
Column 10, line 1, delete "for" and insert --of--;
Column 10, line 35, after "fabric;" --whereby,-- should begin the remainder of the main paragraph of the claim at the left margin; Column 10, line 68, "orientation" should be --operation--; Column 13, lines 8 and 9, delete "reoriented"; Column 17, line 19, "21" should be --30--.

Signed and Sealed this

Eighteenth Day of March 1980

[SEAL]

Attest:

SIDNEY A. DIAMOND

*Attesting Officer*     *Commissioner of Patents and Trademarks*